United States Patent
Skourup et al.

(10) Patent No.: US 7,353,081 B2
(45) Date of Patent: Apr. 1, 2008

(54) METHOD AND A SYSTEM FOR PROGRAMMING AN INDUSTRIAL ROBOT

(75) Inventors: Charlotte Skourup, Drammen (NO); John Pretlove, Sandvika (NO)

(73) Assignee: ABB Research Ltd., Zürich (CH)

( * ) Notice: Subject to any disclaimer, the term of this patent is extended or adjusted under 35 U.S.C. 154(b) by 116 days.

(21) Appl. No.: 10/996,056

(22) Filed: Nov. 24, 2004

(65) Prior Publication Data

US 2005/0251290 A1 Nov. 10, 2005

Related U.S. Application Data

(63) Continuation of application No. PCT/IB03/01939, filed on May 20, 2003.

(30) Foreign Application Priority Data

May 24, 2002 (NO) .................................. 20022484

(51) Int. Cl.
*G06F 19/00* (2006.01)
(52) U.S. Cl. ...................... 700/245; 700/259; 700/264; 318/568.2
(58) Field of Classification Search ................ 700/245, 700/259, 264; 318/568.2
See application file for complete search history.

(56) References Cited

U.S. PATENT DOCUMENTS

| | | | |
|---|---|---|---|
| 4,945,493 A * | 7/1990 | Huang et al. ................ 700/251 |
| 5,184,051 A | 2/1993 | Schweiker et al. | |
| 5,521,477 A | 5/1996 | Sasaki | |
| 5,543,802 A * | 8/1996 | Villevieille et al. ..... 342/357.06 |
| 6,507,782 B1 * | 1/2003 | Rumbo et al. ............... 701/121 |
| 6,535,793 B2 * | 3/2003 | Allard ......................... 700/259 |
| 6,553,311 B2 * | 4/2003 | Ahearn et al. ............... 701/213 |
| 6,845,297 B2 * | 1/2005 | Allard ......................... 700/259 |
| 2004/0189675 A1 * | 9/2004 | Pretlove et al. .............. 345/633 |
| 2004/0193321 A1 * | 9/2004 | Anfindsen et al. ........... 700/257 |
| 2005/0149231 A1 * | 7/2005 | Pretlove et al. .............. 700/264 |
| 2005/0256611 A1 * | 11/2005 | Pretlove et al. .............. 700/264 |

FOREIGN PATENT DOCUMENTS

DE 19626459 A1 1/1998

(Continued)

*Primary Examiner*—Thomas Black
*Assistant Examiner*—McDieunel Marc
(74) *Attorney, Agent, or Firm*—Venable LLP; Eric J. Franklin

(57) ABSTRACT

A method for programming an industrial robot. The robot is taught a path having waypoints located on or in the vicinity of an object. An image of the object is obtained. Information is obtained about the position of a pointer pointing at points. The position of the points relative to the object is determined. A point being pointed out is stored as a waypoint. A graphical representation is generated of the stored waypoint and the point being pointed out. A view is displayed including the object and the graphical representation. A system includes a pointer for pointing out points on or in the vicinity of the object, a position determiner determines the position of the points relative to the object, a camera delivers an image of the object and the pointer, a graphical generator generates graphics, a display displays a view including the object and graphical representation, and an activator.

11 Claims, 3 Drawing Sheets

FOREIGN PATENT DOCUMENTS

| | | |
|---|---|---|
| EP | 0832346 A1 | 7/1998 |
| EP | 1215017 A2 | 6/2002 |
| JP | 5233055 A | 9/1993 |
| JP | 9225872 A | 9/1997 |
| JP | 10011122 A | 1/1998 |
| JP | 11058276 A | 3/1999 |
| WO | WO 9800766 A1 | 1/1998 |
| WO | WO 03099526 A1 | 12/2003 |

* cited by examiner

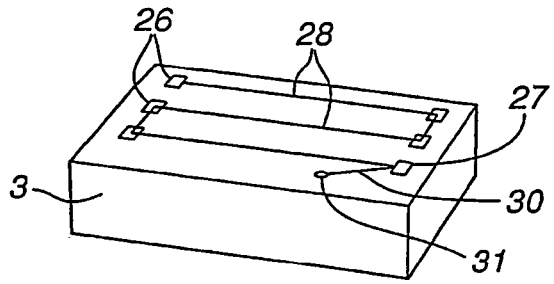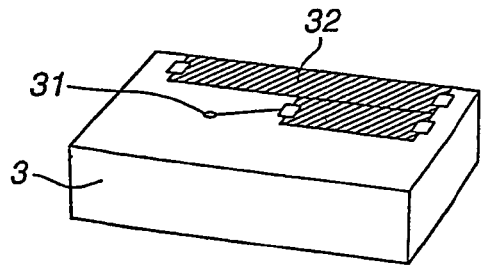
Fig. 3a     Fig. 3b
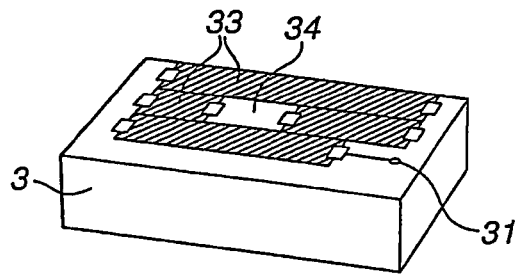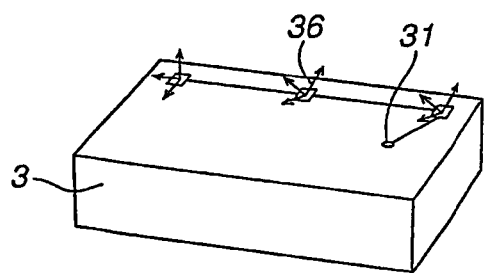
Fig. 3c     Fig. 3d
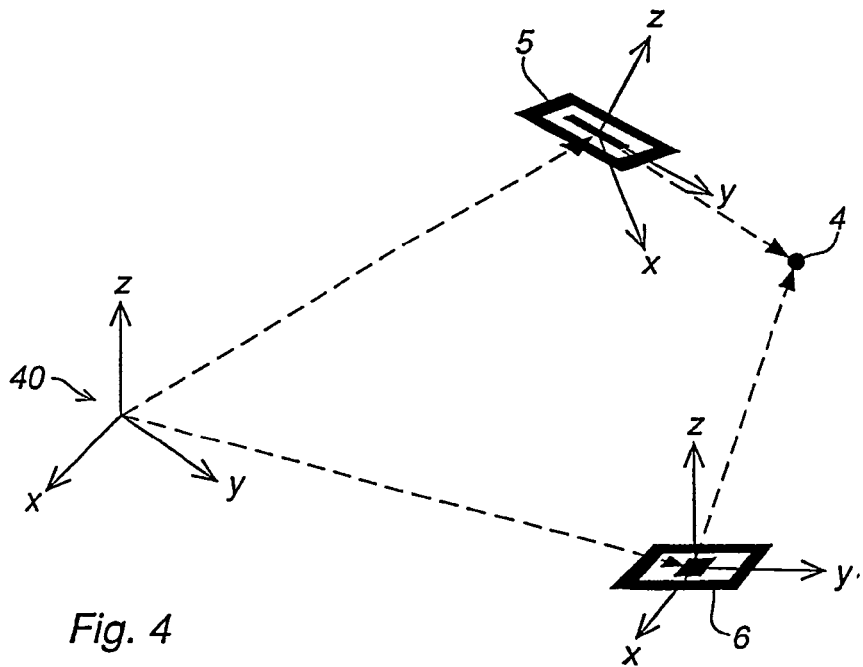
Fig. 4

METHOD AND A SYSTEM FOR PROGRAMMING AN INDUSTRIAL ROBOT

CROSS-REFERENCE TO RELATED APPLICATIONS

This application is a continuation of co-pending PCT/IB03/01939 filed 20 May 2003.

FIELD OF THE INVENTION

The present invention relates to a method in connection with programming of an industrial robot, comprising teaching the robot a path which has a number of waypoints located on or in the vicinity of an object to be processed by the robot. The processing of the object could be any type of surface processing application carried out by an industrial robot, such as painting, polishing, grinding, and welding.

The present invention also relates to a computer program product directly loadable into the internal memory of a computer, comprising software code portions for performing the steps of the method according to the invention, when said product is run on a computer.

The present invention also relates to a computer readable medium having a program recorded thereon, where the program is to make a computer perform the steps of the method according to the invention when said program is run on the computer.

The present invention further relates to a system for use in connection with programming of an industrial robot, the system comprising a pointing member adapted to point out points on or in the vicinity of the object, a position determining means, determining the position of said points in relation to the object, a camera adapted for delivering an image of the object and the pointing member, a graphical generator, generating graphics by means of a computer and a display member, displaying a view comprising the object and said graphical representation projected on the object.

PRIOR ART

Robots are often used for processing the surface of an object. Existing practice for programming a robot involves teaching the robot a sequence of waypoints. The waypoints define the path, which the robot shall follow during the processing of the object. A waypoint comprises three-dimensional position and three-dimensional orientation information. The robot is taught how to perform the task by being guided through the various waypoints along the desired operating path during the programming. These waypoints are stored as instructions into a memory in the robot control unit. During operation of the robot, the program instructions are executed, thereby making the robot operate as desired.

Generally, the robot is programmed to perform a task by an human operator who manually jogs the robot to the desired positions along the path using a movable programming unit, a so-called teach pendant. An industrial robot usually carries an end-effector comprising a tool for performing the processing, for instance a welding tool or a painting tool. During programming of the path, the operator has to position and orient the end-effector in each waypoint along the path. Alternatively, if a 3D CAD model of the object exists, a person with a computer scientist background teaches the waypoints in a robot simulation system, so called off-line programming. Existing methods based on the CAD approach provide visual feedback in a virtual world, i.e. a representation of the real world and the real object.

Either way, the teaching process is time consuming, troublesome, error prone, and in almost all cases requires several iterations before the program is acceptable. The CAD approach is costly and not always intuitive to use. The complexity of the CAD-system requires the operator who is programming the robot to have knowledge about computer science. Such a person usually has little or no knowledge about the process. In the case of manual teaching, the control of the process is often difficult to optimize, but it has the advantage of indirectly utilizing implicit process knowledge of the operator. Another disadvantage with the manual teaching method is that it does not include any visual feedback to the operator, visualizing what has been programmed. The operator must use the trial and error method until the program is acceptable. For example, when the robot is to be taught how to paint an object and the entire surface of the object must be covered with colour, it is impossible for the operator, without running the program afterwards, to see if he has missed some part of the surface. Thus, a number of iterations are required before the quality of the processing, in this example the painting, is satisfactory.

From the Japanese patent JP10011122 an improved method for teaching an industrial robot is known. The method includes presenting a visual feedback to the operator of the response resulting from an operation before the robot is operated. The visual feedback is represented together with the real object. The method comprises: measuring the current state of the robot and its environment by a CCD camera, the operator inputs robot operation information by the teaching pendant, estimating a response after the operation of the robot based on the inputted information, converting the estimated operation into information to be displayed as a picture, preparing picture information related to the response of the robot based on the information related to the camera and the estimated information, synthesizing the estimated response based on the picture information measured by the CCD camera and the picture information related to the response of the robot, and displaying a view comprising the robot, its environment and the estimated response of the robot. Thus, this method shows the next operation to be performed by the robot, but it does not provide any visual feedback to the operator regarding what he has been programmed.

SUMMARY OF THE INVENTION

The object of the present invention is to provide an improved industrial robot programming solution, which reduces the teaching time for the teaching process and increases the quality of the processing result in the first iteration.

According to one aspect of the invention, the object is achieved by means of the initially defined method, comprising: obtaining an image of the object, obtaining information about the position of a pointing member pointing at points on or in the vicinity of the object, determining the position of the points in relation to the object based upon said obtained information, storing the point being presently pointed out by the pointing member as a waypoint upon receiving a recording signal, generating a graphical representation of the stored waypoint and the point being presently pointed at by the pointing member, and displaying a view comprising the object and said graphical representation projected on the object based on the image of the object and the generated graphical representation of the points. Preferably, the image of the object is obtained by means of a camera.

This method improves the teaching process by visualizing recorded information about the waypoints of the robot path in real time and in relation to the real object to be processed. Computer generated information, representing the robot path taught by the operator, is displayed or visualized projected on the object. Thus, the operator gets real-time visual feedback on his actions. The operator does not need any particular computer knowledge and he uses his knowledge and experience about the process during teaching of the robot. The operator can walk around the object pointing out the waypoints of the path and immediately see the result of what he has been teaching. The method according to the invention is more efficient than the prior art methods and supports the use of implicit knowledge of the operator. It is no longer necessary to run the robot program to view the result of the programming. Thereby, the number of iterations needed and thus the teaching time is reduced.

According to an embodiment of the invention the method further comprises generating a graphical representation of the path between the latest stored waypoint and the point presently being pointed out. By visualizing the path between the latest waypoint and the point, which the operator is presently pointing at, it is easier for the operator to estimate whether the point is suitable as a waypoint. If the operator finds the point suitable he records it, otherwise he moves the pointing member to a new point. Preferably, the method further comprises generating a graphical representation of the path between at least some of the stored waypoints. By showing the path between the waypoints, it is simple for the operator to see whether he has missed some part or parts of the object and to see which parts of the object are left to cover.

According to a further embodiment of the invention, the method further comprises: obtaining information about whether the processing shall be on or off between the waypoints, and generating a graphical representation of the path between the stored waypoints depending on whether the processing shall be on or off. When processing is of the path is either not visualized at all or visualized in a different way from when processing is on. In certain applications, the paths between some of the waypoints shall not be processed and the paths between the other waypoints shall be processed. For example, during painting of an object, the painting is on between some waypoints and the painting is off between other waypoints. It is advantageous for the operator to be able to distinguish between the paths for which he has ordered processing on and the paths for which he has ordered processing off.

According to a further embodiment of the invention, the method further comprises: receiving information related to the processing, generating a graphical representation of the path between the stored waypoints, which depends on the received information related to the processing. The information received is for example information about tool configuration. Thus, it is possible for the operator to estimate if the tool configuration chosen achieves the desired result. For an example, the information related to the processing can be which brush to be used for painting and the width of the path visualized between the waypoints depends on the width of the chosen brush.

According to a further embodiment of the invention, the displaying step further comprises: registering the generated graphical representation of the point to the image of the object to provide a composite augmented reality image and displaying a view showing the object and the point based on the composite augmented reality image. An augmented reality system merges computer-generated graphics of objects with the user's space in the real world. In this embodiment, the computer generated graphics of the waypoints and paths are merged with the image of the real object. Alternatively, the computer-generated graphics of waypoints and paths is displayed on see-through glasses worn by the operator. The generated graphics are projected on the glasses so that the operator can see the waypoints and paths projected in relation to the real world and the object.

According to a further embodiment of the invention, the step determining the position of the point comprises: recognizing a first marker within the image, said first marker being positioned in a fixed relation to the object, recognizing a second marker within the image, said second marker being positioned in a fixed relation to a pointing member pointing out the point, determining the position of the point in relation to the object based upon the first and the second marker. This method for determining the position of the point being pointed out by the pointing member does not require any additional measuring equipment for measuring the position of the point besides the two markers.

According to a further embodiment of the invention, the method further comprises: obtaining information about position and orientation of the pointing member and generating a graphical representation of the orientation of the pointing member in the point based upon the obtained information. During programming of the robot, the operator also needs to teach the robot how to orientate the tool. The programming is further simplified if the orientations of the tool in previously programmed waypoints are visualized to operator.

According to a further embodiment of the invention, the method further comprises generating robot programming code based upon the determined position of the waypoint. Robot program code is automatically generated based on the position of a recorded waypoint. Preferably, the robot programming code is also generated based upon the orientation of the pointing member in the point. Thus, the operator does not need any knowledge about robot code generation to be able to teach the robot how to process the object. The operator teaches the robot how to perform the processing by pointing at the object and recoding the desired waypoints.

According to a further aspect of the invention, the object is achieved by a computer program product directly loadable into the internal memory of a computer, comprising software code portions for performing the steps of the method according to the invention, when said product is run on a computer. The computer program product is provided either on a computer readable medium or through a network such as the Internet.

According to another aspect of the invention, the object is achieved by a computer readable medium having a program recorded thereon, where the program is to make a computer perform the steps of the method according to the invention, when said program is run on the computer.

According to still another aspect of the invention, the object is achieved by the initially defined system characterized in that it comprises an activating member, storing a point as a waypoint upon activating and that the graphical generator is adapted for generating a graphical representation of the stored waypoints and the point being presently pointed out by the pointing member based on the image of the object and the positions of the points.

According to a further embodiment of the invention, the system comprises means for indicating options for the configuration of the process and the graphical generator is adapted for generating a graphical representation of the path between the stored waypoints based on the indicated option or options.

According to a further embodiment of the invention, the system comprises a second activating member, which upon activating deletes a saved waypoint. In one embodiment, the last waypoint is deleted. By such an activating member, the operator may delete a wrongly saved waypoint and correct it by saving a new waypoint while he is programming the robot.

According to a preferred embodiment of the invention, the pointing member is arranged separated from the robot and is adapted for being held and handled directly by an operator.

According to a further embodiment of the invention, the activating members are arranged on the pointing member. This arrangement makes it easy for the operator to point out the waypoints, record the waypoints, and delete them without releasing the grip of the pointing member.

BRIEF DESCRIPTION OF THE DRAWINGS

The invention will now be explained more closely by the description of different embodiments thereof and with reference to the appended figures.

FIG. 2b shows side view of the pointing member shown I FIG. 2a.

FIG. 2c shows top view of the pointing member shown I FIG. 2a.

FIGS. 3a-d show examples of augmented reality views showing a graphical representation of waypoints projected on a real object.

FIG. 4 shows the relation between the pointing member and two markers.

DETAILED DESCRIPTION OF PREFERRED EMBODIMENTS OF THE INVENTION

Figure 1:
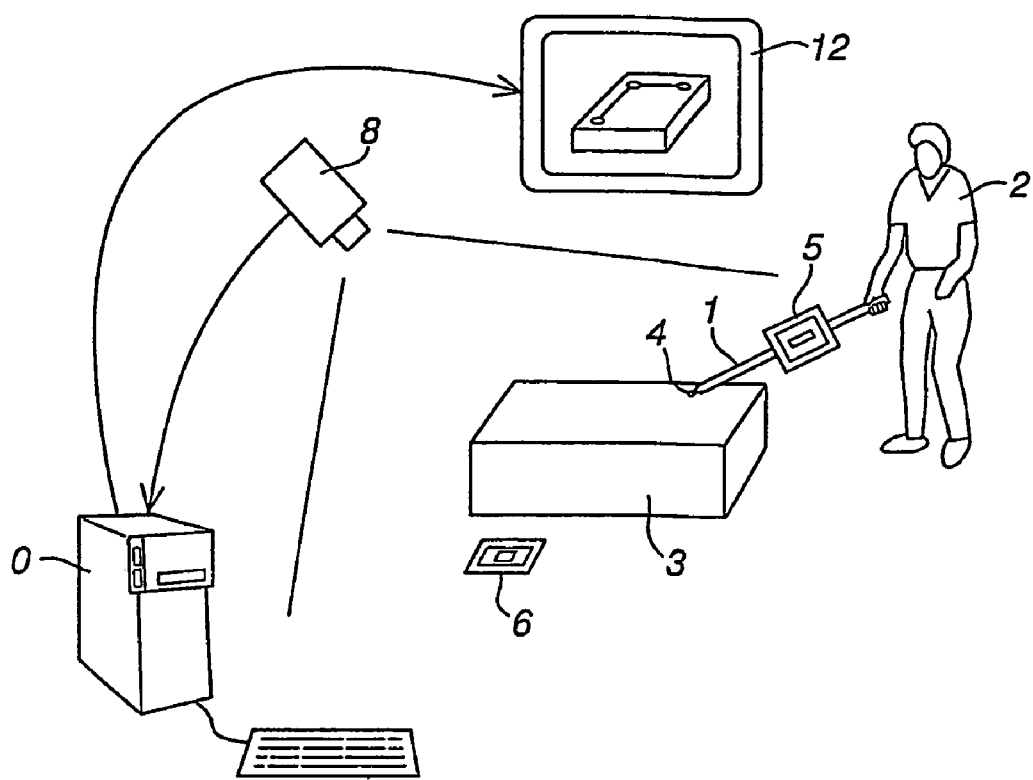
FIG. 1 shows a system for use in connection with programming of an industrial robot, according to an embodiment of the invention.

FIG. 1 illustrates a system for use in connection with programming of an industrial robot according to the present invention. The system comprises a pointing member 1 utilized by a human operator 2 for teaching the robot how to process an object 3. The pointing member can either be the processing tool itself, or preferably a device particularly adapted for the purpose of teaching the processing of the object. The pointing member could, for example, be a pen shaped device or an imitation of the processing tool, such as a paint-gun. The teaching comprises teaching the robot a path including a number of waypoints given in a specific sequence and located on or in the close vicinity of the object 3. Each waypoint comprises the position of a point on or in a close vicinity of the object, the orientation of a processing tool, such as a paintbrush, in the point, and data related to the processing.

The operator holds the pointing member 1 in his hand and points at the point he wants to include in the path and orientates the pointing member as he wishes the processing tool to be oriented in the point. The operator records a point by activation of an activation member, which generates a recording signal. Upon receiving the recording signal the system stores the point as a waypoint. The pointing member 1 is provided with a marker 5, called a pointing marker, attached thereto. The pointing marker 5 is used for determining the position and orientation of the pointing member 1. Alternatively, the pointing device may generate positions and orientations in a number of different ways. For example, the pointing member can be a mechanical digitizer arm providing the position and orientation of its tip or the pointing member may include a sensor for determining position and orientation. Examples of sensors and technologies for determining positions and orientations are accelerometers, ultrasound, laser technology, and a Global Positioning System (GPS).

The system is based on image recognition and requires at least one reference marker 6. The function of the reference marker 6 is to make up a reference point for image recognition algorithms, and a reference point to which computer generated graphics should be related. The system further comprises a camera 8. The camera 8 must be arranged so that, the object 3 to be processed and the markers 6, 5 are in the field of vision of the camera. The camera can either be fixed in the space or moved around. For instance the camera can be attached to the operator's head or elsewhere on his body. All types of cameras can be used, but the demand for accuracy of position and orientation determines the type of camera. For example, a web camera, a video camera, or a CCD camera could be used. In another embodiment, more than one camera can be used, for example two cameras could be used arranged so as to provide stereoscopic images.

The camera 8 provides either an analogue or a digital video signal, which is transferred to a computer 10 including a processor. The processor of the computer 10 is utilized for running the image recognition algorithms for determining the position and orientation of the pointing member 1 in relation to the object, for running algorithms generating a graphical representation of waypoints pointed out by the operator, and for combining the generated graphics of the waypoints with the image provided by the camera 8 to provide a composite augmented reality image.

A display member 12 visualizes the view of the camera combined with the computer-generated graphics, which, in this case, are the recorded waypoints and the path between the points. In this embodiment, the display member is a computer screen. Other types of displays, such as a Personal Digital Assistant (PDA) screen and wearable glasses, could also be used. In the case of a PDA, the operator will hold the PDA in his hand while programming and the outcome of the programming will be visualized on the PDA screen. In the case of wearable glasses, the operator will wear the glasses on which the computer-generated information is projected in relation to his position in the room. In another embodiment, the operator may have a head-mounted unit including a head-mounted display with a camera attached to the display.

Figure 2A:
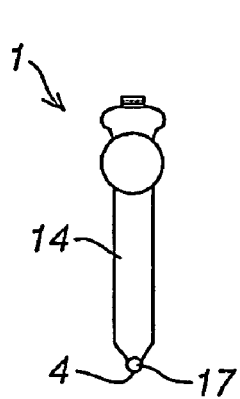
FIG. 2a shows a front view of an example of a pointing member.
Figure 2B:
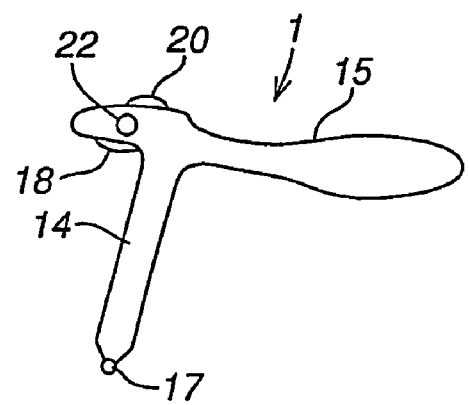
Figure 2C:
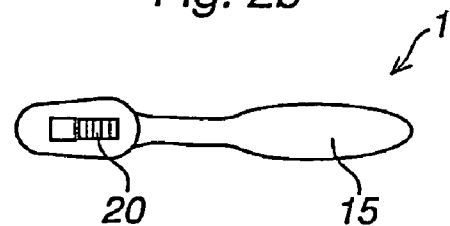

In the following the pointing member 1 will be described in more details. FIGS. 2a-2c show an example of an embodiment of the pointing member 1 comprising an elongated body 14, one of its ends having a tip 4 adapted for pointing out points on or in the vicinity of the object and the other end comprising a handle 15 adapted for being gripped and held by the operator. The pointing member 1 comprises a number of interaction means 17, 18, 20, 22 adapted for interaction between the operator and the system. The interaction means can for example comprise push-buttons. One of the interaction means comprises an activating member 17, which upon activation generates a recording signal for recording the point as a waypoint. In this embodiment the activating member 17 is a push-button arranged in the tip 4 of the body 14.

A second interaction means is used for indicating whether the processing should be on or off between the waypoints.

For example, if the process is painting, the interaction means indicates whether the paint is on or off, or if the process is polishing the interaction means indicates whether the polishing in on or off. In this embodiment the interaction means is a push-button 18 arranged on the pointing member 1. For example the push-button 18 is of a type which is held while processing is on and released while processing is off. Alternatively, the push-button shifts the status from on to off, and vice versa.

The system is provided with a third interaction means for input of information related to the process to the system. The third interaction means may be adapted for showing options for configuration of the process to be selected by the operator. In this embodiment the third interaction means 20 is located on the upper side of the pointing member 1 and is implemented as a scroll mechanism with a small display showing the configuration of the process. For example, in a paint application, it is possible to select one or several options for the paintbrush stored in the robot controller. For other applications, for example polishing, the options relates to the configuration of the polishing brush. Alternatively, the third interaction means can be implemented as a push-button where a new push selects the subsequent configuraton and hence, the operator must scroll through the entire list to get to the start.

The fourth interaction means allows the operator to delete recorded waypoints. The fourth interaction means comprises an activating member 22, which upon activation deletes a recorded waypoint. In this embodiment, the activating member 22 is a push-button arranged on the pointing member and allows the operator to delete the last recorded point. Hence, the operator can also delete a sequence of stored waypoints starting with the last recorded waypoint. Alternatively, the interaction means 17, 18, 20, 22 can be implemented as a part of the computer interface, so that the operator interacts both via the pointing member for recording position and orientation and, via the computer 10.

The output from the interaction means is either transferred via a wire or wirelessly from the pointing member 1 to the computer 10. In another embodiment it is possible to implement the interaction means in the software interface, for example as a group of radio buttons.

While teaching the robot, the operator records waypoints to be passed through during the processing of the object and he also records process related information in connection with the waypoints by using the interaction means. During the teaching, the operator moves the pointing member 1 and positions its tip at points on or in the vicinity of the object, and if the operator is satisfied with the location of the point, he records it by activating the activating member 17. In relation to each recorded waypoint, the operator uses the push button 18 to indicate whether the processing should be on or off. The robot programming utilizes the interaction means 20 to indicate the status of process related information, such as specification for tool configuration. The interaction means 18, 20 must be selected before the operator records a new waypoint. At the moment of recording, the status of the interaction means 18, 20 is read into the system. Alternatively, the status of the input means 18, 20 are read after recording a new point.

As the operator records waypoints, representing the path on the object, computer generated information is visualized on the display 12. Thus, the operator gets real-time visual feedback on his actions. Before the first point is recorded, the display shows the real world without any computer generated information. When the operator records a point, the waypoint is visualized, for example as a dot on the display. FIG. 3a is an example of a view shown on the display during the teaching. The view comprises the object 3 and a graphical representation of the recorded waypoints 26, 27 and the path 28 between the waypoints, projected on the object. The displayed waypoints 26, 27 can be color-coded for distinguishing between different points defined by specific sequences of actions.

A line 30 between the last recorded waypoint 27 and the point 31 being presently pointed out by the pointing member, in this embodiment the tip 17 of the pointing member, is visualized and displayed. This line 30 is virtual, i.e. it is generated by the computer and visualized as computer generated information and operates like a rubber band between the last recorded waypoint and the tip of the pointing member. The operator can see the points and lines on the display 12. When the operator records a new waypoint, the virtual line 30 becomes fixed between the two waypoints. The waypoints represent the positions of the robot on its path for processing the object. In addition to the position, the orientation of the pointing member is also recorded and the recorded orientation represents the orientation of the robot tool. Hence, the recorded sequence of waypoints creates the basis for the robot path in the robot program.

FIG. 3b shows an embodiment of the invention, in which the width of the path 32 is shown between the waypoints. The width of the path depends on information related to the processing, such as the chosen tool configuration, input by the operator via the interaction means. For example, if a narrow brush is selected the width of the visualized path is narrow and if a wider brush is selected the width of the visualized path is wider. To display the width of the path makes it easier for the operator to decide where to locate the next waypoint to avoid processing parts of the object, which has already been processed, and to notice parts of the object, which should be processed. The operator can immediately see if he has missed to cover some part or parts of the object.

FIG. 3c is a view illustrating a path comprising parts 33 for which processing is on and other parts 34 for which processing is off. If the operator indicates that the processing shall be off between two waypoints, no path is shown between the waypoints and if the operator indicates that the processing shall be on between two waypoints, the path between the waypoints is visualized. Alternatively, indicative graphics, such as a line or a colour-coded path, is shown between the waypoints if the processing shall be off.

FIG. 3d shows a view including a graphical representation 36 of the recorded orientation in the waypoints. The orientation is illustrated for example by three orthogonal axes x, y, z.

By pointing with the tip of the pointing member the operator shows where on the object to capture data, such as position and orientation and changes in the status of the processing, and he also shows the correct sequence of waypoints and process related information. While the operator makes a new robot program, he can delete and edit recorded points. The operator can delete the last recorded point while he is programming. After the programming is finished, the operator uses the pointing member to grab a recorded point by locating the pointing member next to the point to be edited and activates the activating member 17. He then moves the pointing member with the waypoint to the new position. The rest of the graphics is updated simultaneously in real time. The operator releases the activating member 17 at the new position and the new orientation.

To be able to generate a complete robot program, the system needs information about the configuration of the robot in the robot cell. A configuration files must be available. The operator can, for instance, generate these data from the computer. The configuration file contains data, such as configuration data, stored in the robot controller, a definition of the robot tool, a definition of the object coordinate system, and other relevant data. Alternatively, the configuration file can already exist and therefore be reduced. The operator should have the possibility to edit an existing configuration file.

As the operator has finished the teaching sequence of waypoints and a configuration file exists, the computer takes the recorded waypoints and the configuration file as input and generates a robot program with the right syntax for the specific robot controller. Then, a robot program generator generates the robot program. The robot program generator can be any robot programming generator known to those skilled in the art. The tasks of the robot program generator are; locating the recorded points at the right places in relation to the real path of the robot, generating the right syntax, and translating the input to the robot to a programming language. The robot program is either downloaded to the robot controller so that the robot can execute the program or integrated into a larger robot program as a module, in case the robot program contains a sequence of different objects.

This embodiment of the system described herein is based on image recognition and utilizes two markers, the reference marker 6, which is provided in a fixed relation to the object 3 and the pointing marker 5 being attached to the pointing member 1. The markers 5, 6 must be distinct and asymmetric so that they can be recognized from all angles. The pointing marker 5 must be provided with a pattern different from the pattern of the reference marker 6. The function of the reference marker 6 is to provide the image recognition algorithm with a reference point in the world to which the computer generated graphics should be related. One reference marker is enough to represent the reference coordinate system, but it is also possible to use more than one reference marker forming a pattern of reference markers, which defines the reference coordinate system. If the camera is not fixed, for example worn by the operator or otherwise moved around the object, several reference markers may be necessary to enabling recognition of the reference coordinate system from various viewpoints. The image recognition algorithm requires that the reference marker or markers is/are within the view of the camera.

Since the position and orientation of the pointing member, in this embodiment, is determined by image recognition the system must comprise the pointing marker 5. If the position and orientation of the pointing member are determined by the other methods mentioned above, the system only needs the reference marker. The function of the marker 5 is to recognize where the pointing member is located in relation to the reference coordinate system given by the reference marker 6. The image recognition algorithms use the pointing marker 5 to generate position and orientation of the pointing member based on the size and orientation of the pointing marker 5 in relation to the reference marker 6. If position and orientation are determined by another method, the pointing marker 5 is not necessary. For improving the accuracy of the determination of the position and orientation, two different methods for generating the position and orientation may be used as a complement to each other.

The pattern on the markers 5, 6 must be asymmetric in order to determine the orientation of the marker. The shape of the marker is given by the image recognition algorithms and must be learned in advance. The algorithms cannot recognize a completely new and unknown marker. The markers need to be distinct, so that the image recognition algorithms are able to distinguish between their positions in the world. Otherwise, the image recognition algorithms would not be able to determine which of the markers would represent the reference coordinate system and which one would give the position and orientation in relation to the reference coordinate system.

FIG. 4 illustrates the coordinate systems of the pointing marker 5 and the coordinate system of the reference marker 6. It is to be noted that the figure only illustrates one reference marker but the system may just as well include more reference markers or a pattern of reference markers. FIG. 4 also illustrates the coordinate system 40 of the camera 8 in relation to the coordinate systems of the markers 5, 6. The relationship between the marker 5 and the tip 4 of the pointing member 1 must be known, so that the position and orientation of the tip can be determined. The image recognition algorithms recognize the pointing marker 5. The position of the tip of the pointing member and the orientation of the body 14 of the pointing member in the reference marker coordinate system is determined by the recognition of the markers 5, 6. The recognition is based on the size and angle of the pattern on the marker in relation to the known pattern learned by the image recognition algorithms. The position is given in 3D as [x, y, z]. The orientation is given in 3D, for example as a rotation matrix [a 3×3 matrix].

In case a sensor is used to determine the position and orientation, the pointing member provided with such a sensor need to be calibrated to the reference marker coordinate system in order to give the position and orientation in the correct coordinate system. If the pointing member is provided with a sensor, which is combined with a marker attached to the input device, a calibration is still necessary.

Figure 5:
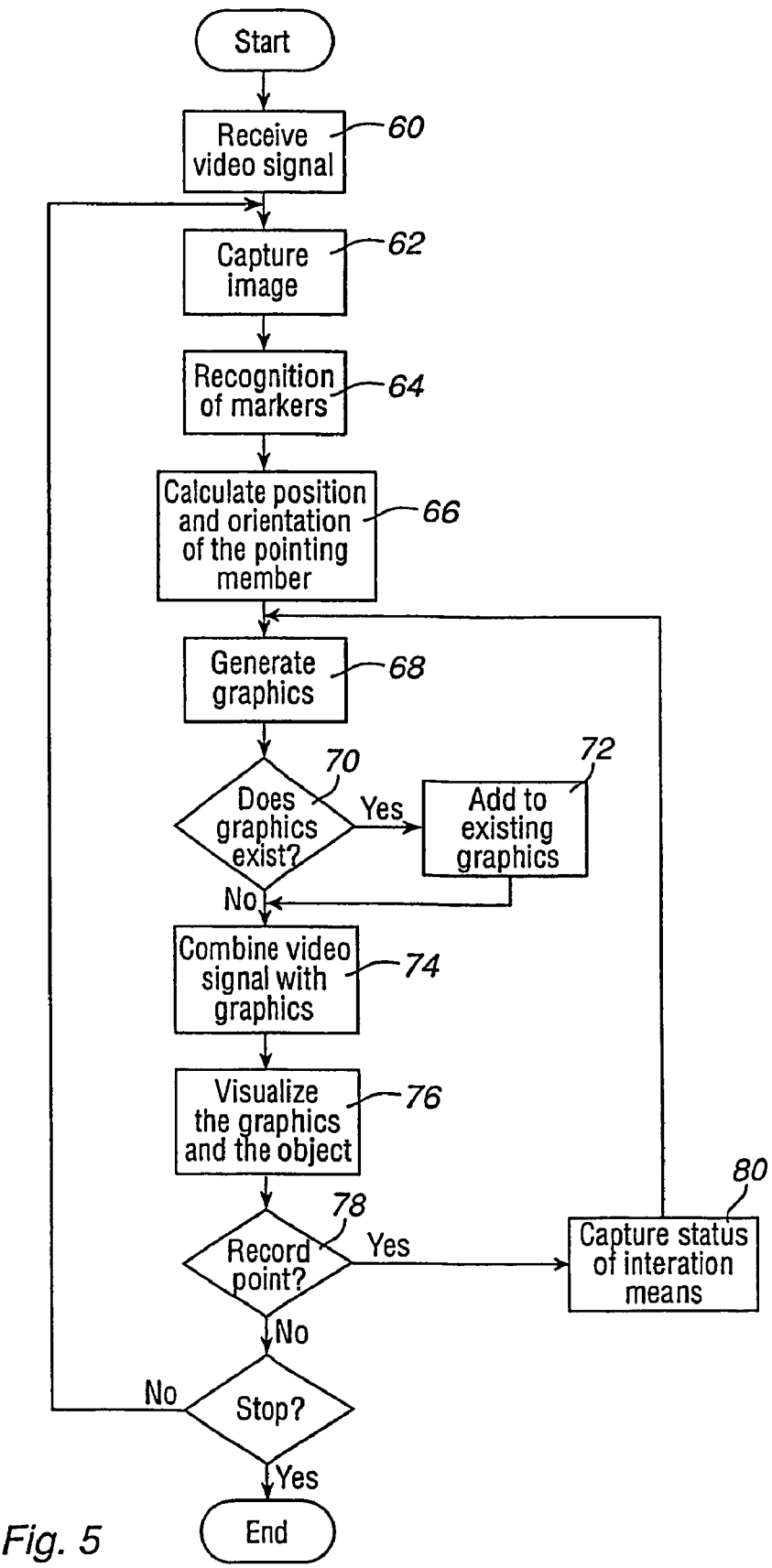
FIG. 5 shows flow chart of a method according to the invention for teaching an industrial robot a path.

FIG. 5 is a flow chart illustration of the method and the computer program product according to an embodiment of the present invention. It will be understood that each block of the flow chart can be implemented by computer program instructions. In block 60 a continuous stream of video signals is received from the camera 8. Since the object 3 and the makers 5, 6 are in the view of the camera, the image obtained comprises the object and the markers. In block 62 an image is captured for use by the image recognition. Alternatively, several images could be captured for improving the accuracy of the position and orientation. The markers 5, 6 are recognized in block 64 by the image recognition and the position and orientation of the pointing member are calculated in relation to the location of the object or the reference markers, block 66.

A graphical representation is generated of the point being presently pointed out by the pointing member, in this embodiment, of the tip of the pointing member, block 68. Before the first waypoint is recorded, no previously generated graphic exists. In that case the graphic will only include the point being presently pointed out by the pointing member. If one or more waypoints have been previously recorded, graphics already exist including the recorded waypoints, and the generated graphic of the point being presently pointed out are added to the existing graphics, block 70, 72. Graphic is generated representing a line between the last recorded waypoint and the point being presently pointed out.

As seen in block 74, the received video signal is combined with the generated graphics including registering the generated graphical representation to the image of the object to provide a composite augmented reality image. A view of the combined video signal and graphics is displayed, block 76. If a recording signal is received, the statuses of the interaction means are captured and the position, orientation and the captured status for the point being presently pointed out are saved as a new waypoint, block 78, 80.

As the point is recorded as a waypoint, new graphics are generated based on the captured status, block 72. The captured status is, for example, whether processing is on or off and information related to the process. The generated graphics comprise stored waypoints and the point being presently pointed out by the pointing member, in this embodiment, the tip of the pointing member. The display visualizes the view of the camera combined with the generated graphics which in this embodiment are the recorded waypoints, the path between the waypoints, the status of the process, i.e. the processing is on or off, and the width of the path. The width of the path visualizes for example the paint stroke when paint is on.

The software used for implementing the method according to the invention is partly based on software known to those skilled in the art. For example, the position and orientation may be generated in ARTtoolKit based on the position and orientation of the pointing marker in relation to the reference marker. The ARTtoolKit is developed by Washington University and the University of Hiroshima and is an open-source software library that enables augmented reality applications to be built using accurate computer vision-based tracking techniques. For the application interface, the software Open GL may be used. OpenGL provides a library of 2D and 3D functions including modeling alterations, color, light and shade functions. Microsoft Vision SDK is a library for writing programs to perform image manipulation and analyses on computers. The augmented reality software includes algorithms for drawing graphics, such as points and lines, transferring positions and orientations between different coordinate systems, extracting and generating a sequence list of positions and orientations, capturing process related information, and drawing advanced graphics, such as color-coded points and lines representing paint strokes with different widths and orientations.

The method according to invention the is an off-line programming method, i.e. the method may be used outside the robot and the robot controller The present invention is not limited to the embodiments disclosed but may be varied and modified within the scope of the following claims. For example, the present system is not limited to augmented reality systems utilizing a composed video image but may also be utilized in see-through augmented reality systems, in which only the computer generated graphics are presented to the user who views the graphics on a see-through lens with the real world in the background. In a see-through system, the cameras would generate images, which could be utilized for locating the markers within the field of view of the user. The only difference between the two systems is the translation of the camera coordinates into eye coordinates to compensate for the change in perspective between the camera images and the actual real-world perspective of the user. In either case, computer generated graphics are registered to objects in the real world. In the see-through case, the computer-generated graphic is combined with the real-world object by the user rather than in the creation of a composed video image.

It is also possible to utilize the robot itself for moving the pointing member, which for example, is a robot tool. The tool is then provided with a pointing marker attached thereto. The operator moves the tool, or the pointing member held by the robot, by means of the teach pendant.

The invention claimed is:

1. A method in connection with programming of an industrial robot, comprising teaching the robot a path having a number of waypoints located on or in the vicinity of an object to be processed by the robot, the method comprising:
   obtaining an image of the object,
   obtaining information about the position of a pointing member pointing at points on or in the vicinity of the object,
   determining the position of the points in relation to the object based upon said obtained information,
   storing the point being presently pointed out by the pointing member as a waypoint upon receiving a recording signal,
   generating a graphical representation of the stored waypoint and the point being presently pointed at by the pointing member, and
   displaying a view comprising the object and said graphical representation projected on the object based on the image of the object and the generated graphical representation of the points.

2. The method according to claim 1, further comprising:
   generating a graphical representation of the path between the latest stored waypoint and the point presently being pointed out.

3. The method according to claim 1, further comprising:
   generating a graphical representation of the path between at least some of the stored waypoints.

4. The method according to claim 3, further comprising:
   obtaining information about whether the processing shall be on or off between the waypoints, and
   generating a graphical representation of the path between the stored waypoints depending on whether the processing shall be on or off.

5. The method according to claim 3, further comprising:
   receiving information related to the processing, and
   generating a graphical representation of the path between the stored waypoints depending on the received information related to the processing.

6. The method according to claim 1, wherein said displaying step further comprises:
   registering the generated graphical representation of the point to the image of the object to provide a composite augmented reality image and displaying a view showing the object and the point based on the composite augmented reality image.

7. The method according to claim 1, wherein determining the position of the point comprises:
   recognizing a first marker within the image, said first marker being positioned in a fixed relation to the object,
   recognizing a second marker within the image, said second marker being positioned in a fixed relation to a pointing member pointing out the point, and
   determining the position of the point in relation to the object based upon the first and the second marker.

8. The method according to claim 1, further comprising:
   obtaining information about position and orientation of the pointing member and
   generating a graphical representation of the orientation of the pointing member in the point based upon the obtained information.

9. The method according to claim 1, further comprising:
   generating robot programming code based upon the determined position of the waypoint.

10. The method according to claim 9, further comprising:

obtaining information about the orientation of the pointing member, determining the orientation of the pointing member in the point based upon the obtained information and the robot programming code is generated based upon the determined orientation of the waypoint.

11. The method according to claim 1, wherein the image of the object is obtained by means of a camera.

* * * * *